United States Patent

[11] 3,594,726

[72] Inventors William M. Fleisher;
Paul W. Kercher; Ralph M. Nester, all of Newark, Del.
[21] Appl. No. 763,562
[22] Filed Sept. 30, 1968
[45] Patented July 20, 1971
[73] Assignee Nester & Faust Manufacturing Corporation
Newark, Del.

[54] PROGRAMMED SLOPE AND AMPLITUDE RESPONSIVE SYSTEM
11 Claims, 6 Drawing Figs.

[52] U.S. Cl. ........................................ 340/149,
340/167, 328/132
[51] Int. Cl. ........................................ H04q 9/00
[50] Field of Search ........................................ 340/149,
167; 328/132

[56] References Cited
UNITED STATES PATENTS
| | | | |
|---|---|---|---|
| 3,119,070 | 1/1964 | Seliger | 328/132 X |
| 3,328,704 | 6/1967 | Wantland | 328/132 X |
| 3,361,979 | 1/1968 | Luttik et al. | 328/132 X |

Primary Examiner—Harold I. Pitts
Attorney—C. W. Mortenson

ABSTRACT: A system is provided for interpreting a variation in voltage or current at any stage of the variation. The stage at which any variation is to be detected is predetermined by a program control. In the system is a slope detector that sends signals which are measures of the voltage or current, and there is an amplitude detector which sends similar signals, the various signals being received by a logic center which also receives signals from the program control. Upon the proper coincidence of the three signals the logic center sends directive signals to an electrical circuit and this then activates or deactivates an element as desired.

As relating to gas chromatography, the signals coming from a dual thermal conductivity cell are followed in a manner in which the operator knows whether, at a given time, the elution curve is on the positive or negative side or at the peak or unchanging and precisely where it is, or in other words, the amplitude. The operator who wishes to collect the sample being eluted only between two points sets the program control and the slope detector and the amplitude detector to feed the electrical signals to the logic center so that it becomes active precisely at the start of the collection to open a valve and becomes active precisely at the end of the collection to close the open valve. During the time the valve is open the sample desired is being collected in a proper container which is in conduit relationship with the valve. With the respective valve closed, the unwanted material is vented.

INVENTORS
William M. Fleisher
Paul W. Kercher
Ralph M. Nester
BY
ATTORNEY

INVENTORS
William M. Fleisher
Paul W. Kercher
Ralph M. Nester
BY C. W. Mortenson
ATTORNEY

INVENTORS
William M. Fleisher
Paul W. Kercher
Ralph M. Nester
BY C. H. Mortenson
ATTORNEY

PROGRAMMED SLOPE AND AMPLITUDE RESPONSIVE SYSTEM

DISCLOSURE

As stated above, this invention pertains to apparatus and processes for following voltage or current changes. In particular, it relates to following chemical reactions and related measurements through chromatography. In gas chromatography one may trap samples eluted from the column manually, by the zone switch system and by the elapsed time system. The latter is subject to much error, because minor changes in operating conditions, such as in flow rate or temperature, alter the elution time of various peaks markedly. The zone switch system consists of a switch on the recorder which is adjustable to actuate the traps to collect whenever the signal that detector puts out exceeds the level set by the operator. When the output level drops below the set level, the collection system is closed and venting then occurs. While this system is popular, it has several drawbacks, For example, it is not easy to skip peaks nor can one ordinarily break the collection of a peak down into specified parts of the peak. Further, if two peaks occur close together with a high valley therebetween, it frequently is impractical to set the zone switch high enough to split the doublet to trap each peak separately. Finally, the purity of samples collected is generally lower than desired because a low setting of the switch is required to handle the small peaks, and spilling over occurs in those instances where peaks are close together. In the manual system the operator is on hand as the peaks elute and he manually actuates the traps at the proper times to collect or vent. While the system is very flexible and affords the collection of samples of high purity, it is very costly in man-hours.

From the above it can be seen that one desires to start and stop collections as to any peak on any portion of it whether the peak be a single, a doublet or a multiple peak. It is desired to be able to skip any peak or peaks and also to predetermine the criteria under which a given peak is to be collected in whole or in part. Slight changes should not affect the operation, and the expense in time and money should be feasible to the industrial and university researcher.

It is an object of this invention to satisfy the above needs. Another is the provision of a system for interpreting a variation in voltage or current from a source in any stage of the variation and to predetermine the stages at which such variations are to be interpreted. A still further goal is to provide in chromatography a system which affords a means to collect an eluting material between two selected points on a given peak and to treat the entire series of eluting peaks in a given chromatograph at will as to collection or venting. Another objective of this invention is to provide a combination of elements which cooperatively act to close and open a series of collection traps based on electrical data fed into the combined elements. Another purpose of this invention is to allow collection on either the positive or negative slope of any peak. A further object of this invention is to allow multiple collection on sampling any positive or negative going peak or peaks. The above and further objects and details of this invention will be readily apparent from the following description, drawings and examples, all of which is given for purposes of illustration and is not limitative. In the figures FIG. 1 is a block diagram showing the various elements of a system of this invention;

The purposes of this invention are accomplished by the provision of an instrument which combines a slope detector, a level comparator, a sequence detector and selector and a logic section, the combination affording the sending of signals to a mechanism which opens or closes a given trap upon receipt of the correct signal.

Figure 5:
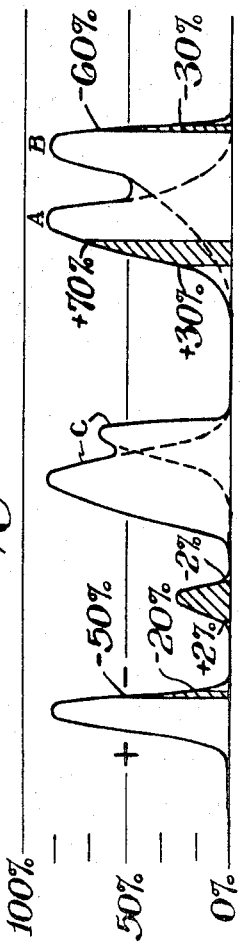
FIG. 5 is a graphical depiction of peaks for illustrative purposes.

As is known, a peak rises to the apex and then eventually falls so that its slope is either changing or it is not changing—that is, the slope will either be positive, zero or negative. Also, each peak will have its respective height and the peaks occur in sequence, so that one conceivably could collect between any two points of a peak as, for example, between −50 percent and −20 percent (referring to slopes) or +2 percent and −2 percent, or collect a doublet as to the first of the doublet, A, between +30 percent and +70 percent and as to the second of the doublet, B, between −60 percent and −30 percent, or skip peaks, C, as shown in FIG. 5, or any variation as desired. The stated combination of elements affords such programming with flexibility and reliability without sacrificing quality, for a number of reasons.

The slope detector is a sensitive slope detector capable of determining and indicating by electrical signals whether the slope of any peak—that is, the output signal coming from the eluting sample, is positive going, negative going or unchanged at any instant. The level comparator accurately compares the input signal from the slope detector to the reference points previously set on the instrument by the operator who also sets the instrument through its peak selector which determines the sequence of detection and which peak is to be studied. These three units, the slope detector, the level comparator and the sequence detector, all feed data to the logic section which on occurrence of the coincidence of conditions needed determines which traps are to be opened for collecting a sample and which are to be closed in order to send unwanted material to the venting section.

The various units are conveniently housed, the instrument having a front panel which bears six elements for setting for trapping and six vent elements and 15 switches for peak selection. Thus, one can set the instrument to select the first, third, sixth and eighth peaks, for example, and apply to any one of them the time for collection and the time for venting. One can make, for example, six cuts on any one peak. Through the device great flexibility and reliability is attained.

Figure 1:
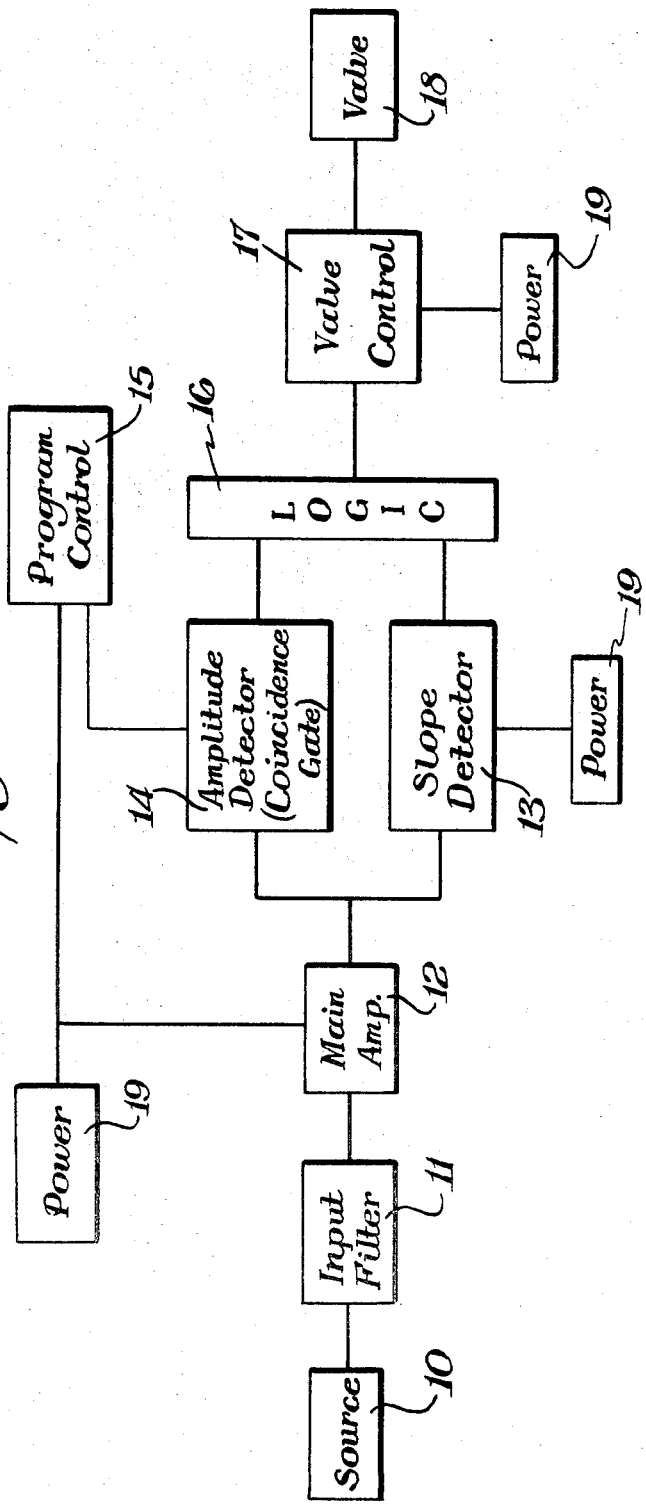

Referring now to FIG. 1, it can be seen that the source 10 being examined, such as the output of the detector of a chromatograph, is fed, after filtering at 11, into an input amplifier 12 the output of which is split and fed to a slope detector 13 and one input of a differential comparator or amplitude detector 14. The slope detection system 13 determines whether the output coming from source 10 is static, positive going or negative going. The system comprises a slope preamplifier, a slope detector, two Schmitt triggers and two relay drivers, not shown in FIG. 1 but described below with reference to FIG. 2B. When a positive slope is seen, a positive relay driver is actuated, and when a negative slope is seen, a negative relay driver is actuated.

The differential comparator or amplitude detector 14 determines when the input level from the chromatograph is the same as the reference input which is switched in from the programmer 15. When they are the same, the differential comparator 14 gives a switched output that is sent to the logic unit 16.

The information provided by the slope detection system 13 is also fed to the logic 16 and acted upon in accordance with the setting of the switches (not shown in FIG. 1 but shown in FIG. 2A) on the programmer 15 to produce an output which can be interpreted and used by the collection control system 17 to advance the collection system or valve 18 to the next collection or vent position.

The programmer 15 comprises 15 switches and represents 1 to 15 possible peaks that could be examined should there be that many in a given analysis. Each switch has its associated pilot light, the switches can be set on and off to program the unit to collect or reject a particular peak or any portion of a given peak. The associated pilot lights, which are lit sequentially every time a plus slope is seen, provide peak counting for the apparatus of this invention. The programmer 15 also has six "trap" amplitude level controls with associated plus or minus slope selection switches along with anticipation lights which tell which controls are going to act on the chromatogram next. In addition the programmer 15 has six "vent" amplitude level controls with associated plus or minus slope selection switches along with anticipation lights which tell which controls are going to act on the chromatogram next.

A slope zero control and slope sensitivity control (neither shown in FIG. 1) are also provided to set the sensitivity at which the slope detector 13 will respond to the input signal from source 10 and also to maintain the desired time constant on the negative slope to prevent its dropping out on a negative signal. The slope zero control permits manual biasing of the slope detector for testing and setup purposes.

A threshold control (not shown in FIG. 1) provides a variable dead band which determines the time duration of a positive going peak necessary to actuate the slope detector. As noted, power 19 is supplied to the input amplifier 12, the slope detector 13, and the valve control 17 of logic unit 16. It is to be appreciated that the source of power may come from a single source rather than separately as shown in FIG. 1.

Five pass hold switches in the programmer 15 control the sequential logic of the trap vent controls, as will be described below.

The above will become readily apparent by the following detailed description, which is given below, with reference to the remaining drawings by way of illustration and is not limitative.

Figure 2A:
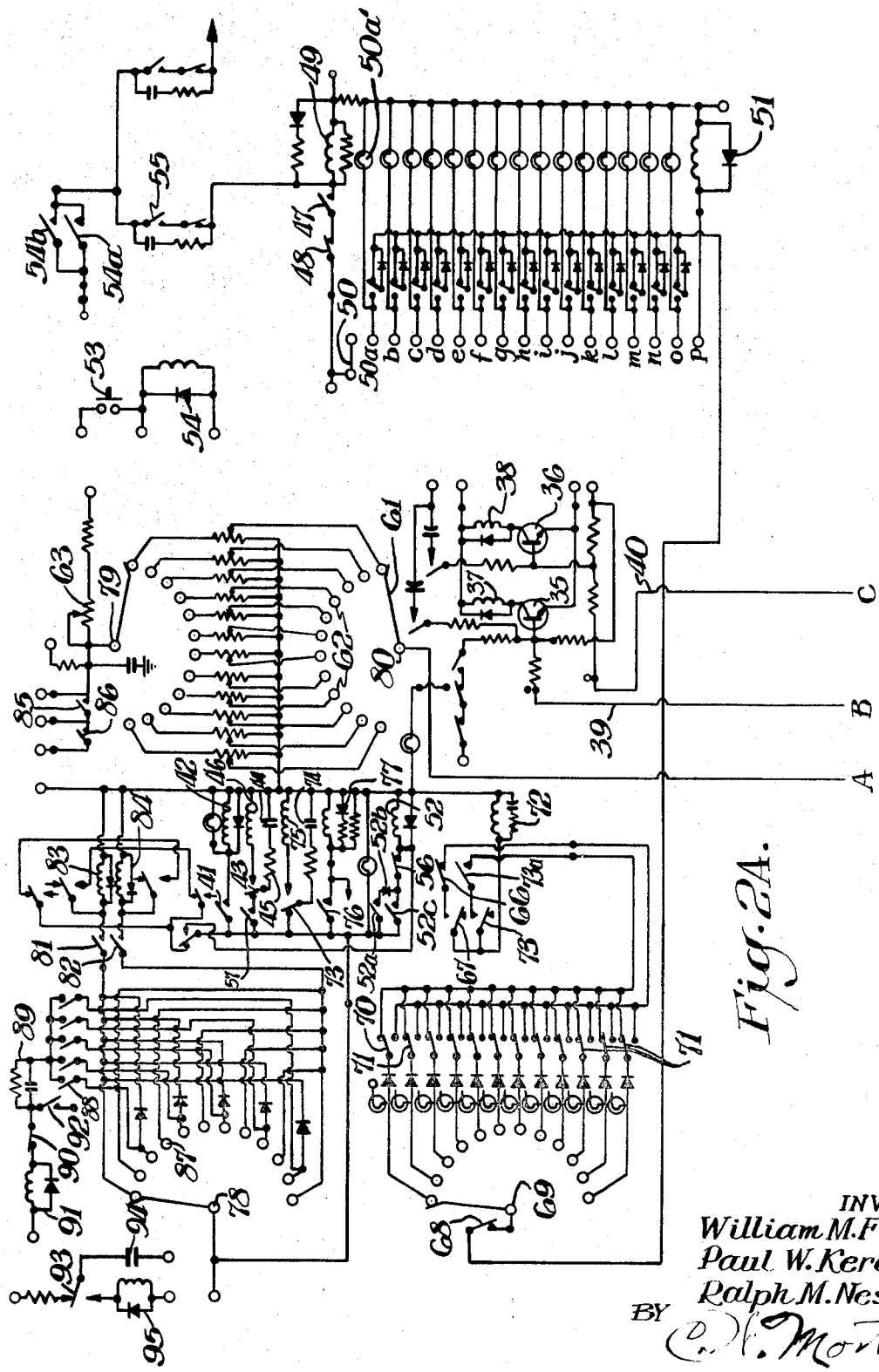
FIGS. 2A and 2B are electrical circuit diagrams showing various parts of various elements and interconnections of the elements as they relate to a peak selector of this invention, FIG. 2A showing the program and logic units and FIG. 2B showing the input amplifier, the slope detector and differential comparator.
Figure 2B:
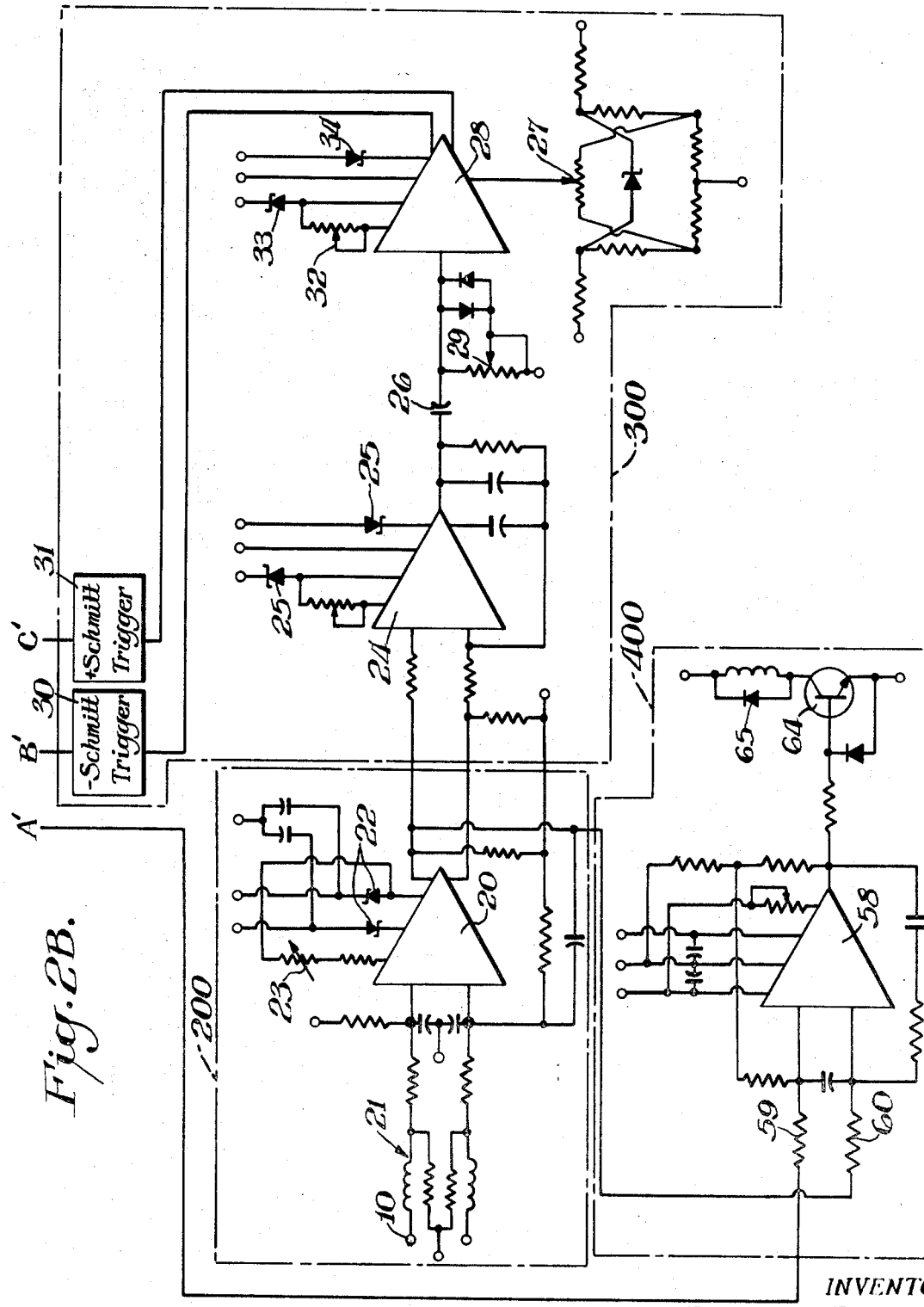

With reference to FIG. 2B, with FIG. 1 in mind, the input 10 is fed into a balanced input differential amplifier 20 which has a gain of about 100, the circuitry of the input amplifier being marked in FIG. 2B by dotted lines 200. With 10 millivolts full scale input an output of 1 volt will be obtained. The input network 21 provides isolation from any spurious spikes and noises from the detector. The two zener diodes 22 are used to drop the + and −18 regulated voltage to 15 volts for the main amplifier 12 (FIG. 1). The 50K potentiometer 23 with the main amplifier 12 is the amplifier zero adjustment means.

The output of the main amplifier 12 is fed to the input of a slope preamplifier 24 and a differential comparator gate, which have as their basic building block a standard operational amplifier. The slope detection circuitry is shown in FIG. 2B by enclosing dotted lines 300. The comparator gate will be covered farther on. The preamplifier 24 has unity gain (a gain of one) and acts as a buffer between the main amplifier 12 on FIG. 1 (20 on FIG. 2B) and the slope detector 13 on FIG. 1 (28 on FIG. 2B). The zener diodes 25 and zero potentiometer (28 on FIG. 2B). The zener diodes 25 and zero potentiometer regulate the voltage for the preamplifier 24 to 15 volts as is done for the main amplifier 12 (20 on FIG. 2B).

The 1000 μfd. coupling capacitor 26 prevents DC coupling between the preamplifier 24 and the slope detector 13 (28 on FIG. 2B) so that the detector 13 (28 on FIG. 2B) will see a positive or negative going input but will not detect a static DC level.

The slope Φ potentiometer 27 provides a bias voltage range of +0.25 volts to −0.25 v. to the slope amplifier 28.

The slope sensitivity potentiometer 29 controls the time constant of the 1000μfd. coupling capacitor 26. When the potentiometer 29 is on zero (wiper on common side of the potentiometer) sensitivity of the slope detector is at zero and input changes have no effect of the slope amplifier 28.

The slope amplifier 28 detects polarity of slope and gives a full scale output on one of the two lines which drive the + and − Schmitt trigger 30 and 31, respectively. For convenience in tying FIGS. 2A and 2B the Schmitt triggers are also designated as B' and C' in FIG. 2B and as B and C in FIG. 2A, respectively.

The slope threshold 32 potentiometrically controls the point at which the slope amplifier 28 will respond to an input. Zener diodes 33 and 34 stabilize the voltage for slope amplifier 28 at 15 volts.

Schmitt triggers 30 and 31 take the changing DC level from the slope amplifier 28 and switch (give a fixed voltage out) when the input voltage reaches a level of 1 volt. This output drives the relay drivers 35 and 36, shown in FIG. 2A, which actuate relays 37 and 38. The + Schmitt trigger 30 actuates relay 37, and − Schmitt trigger 31 actuates relay 38. The relay drivers 35 and 36 take the output voltage of the Schmitt triggers, 30 and 31, through lines 39 and 40, and convert it to a usable current to actuate relays 37 and 38, respectively.

As will be recalled, the number of peaks is, in effect, counted so that at a given count the instant peak can be processed or bypassed. This is effected upon actuation of relays 37 and 38.

When relay 37 is actuated by + relay driver 35, contact 41 actuates relay coil 42 which has the + slope lamp across it. Switch contact 43 closes, discharging the 100 μfd. condenser 44 through the 100 ohm resistor 45 and the coil of relay 46. The total actuation time of relay 46 due to the discharge of the capacitor 44 is 1 second.

The 1 second closure of relay 46 effects a 1 second closure of relay contact 47 (far right in FIG. 2A), and this advances a stepper switch by applying 24 volts through normally closed relay contact 48 to stepper switch coil 49. The stepper switch arm 50 advances from home to position 50a and energizes collect light 50a'. As noted previously, there are 16 switches (50a—50p) which can be used in the selection of peaks.

Other relays pertinent to this part of the circuitry are relays 51 at the far bottom right of FIG. 2A and relay 52 (near center and left). Contact 48 is normally closed and allows switch 23 to actuate stepper switch coil 49 every time switch 23 pulses until stepper switch arm 50 advances past the 15th collect light to position 50p. At this position relay 51 is energized and thus opens relay contact 48. This prevents arm 50 from advancing any further until the unit is reset by push button 53 at which time arm 50 is returned to home position or by relay 54 through contacts 54a and 54b which apply 24 volts DC to the auto home contacts 55. Relay coil 52 is energized by relay contact 52a through the diode 52b when relay coil 38 is energized through—slope relay driver 40. Relay contact 52c closes and holds in relay coil 52 through normally closed contact 56. Contact 57 closes charging the 100 μfd. capacitor 44 through the 100 ohm resistor 45. When relay is energized, relay contact 56 opens allowing relay 52 to open until a negative slope causes it to energize again. Thus, relay 52 prevents stepper arm 50 from being advanced on a + slope light unless being preceded by a − slope, and this prevents a small spike strong enough for a + slope to be detected from being counted as a peak and advancing arm 50.

When the slope of a chosen peak is of the right sign and the elution is at the chosen stage, the element which determines this coincidence functions; this element is the coincidence gate 58 shown in FIG. 2B (left and bottom). It may also be called the differential comparator, the circuitry of which is contained in dotted lines 400 in FIG. 2B. One side of the gate is fed from the output voltage of the main amplifier 12 and will read a nominal 1 volt ahead of the input resistor 59 at full scale input (10 mv.). The other side of the gate at 60 is fed from the rotating selection arm of stepper switch 61 (FIG. 2A) which selects the output voltage set on the "start," "stop" potentiometers 62 of which there are 12. The full scale output of the "start," "stop" potentiometers is nominally 1 volt and is adjusted by means of the span potentiometer 63.

When the voltage on the reference line ("start," "stop" potentiometers) is higher than the voltage on the main amplifier line, the gate causes element 64 (FIG. 2B) to conduct, closing relay 65. When the signal input voltage is increased to the point where the reference voltage is reached, and both inputs to the coincidence gate are the same with respect to common, the gate will cause element 64 to cease conducting, thus deenergizing relay 65.

When looking for a positive coincidence, normally closed relay contact 66 (FIG. 2A, left of center) is open, since relay 65 is energized. When a positive signal is fed to the peak selector computer, contact 67 closes. If contact 68 is not open, positive 24 volts flows through elements 69 to contact 66. When coincidence is reached, relay 65 deenergized allowing contact 66 to close energizing relay 72.

When looking for a negative coincidence, the amplifier output is higher than the reference voltage from the "start stop" potentiometers. Therefore, relay 65 is deenergized. When the negative going input signal is fed into the peak picker, contact 73 closes and the +24 volts goes through contact 68 and element 69, except that it now goes through the negative side of the "start or stop" polarity switches 71 to contact 73a. When coincidence is reached, relay 65 energizes closing contact 73a and energizes relay 72.

When relay 72 is energized, contact 73 discharges the 100 mfd. capacitor 74 through the coil of relay 75 holding it in for 1 second. Contact 76 closes for 1 second and advances stepper switch 77 of which elements 69, 78, 79 and 80 are switch banks.

When relay coil 75 is energized contacts 81 and 82 (top left in FIG. 2A) are also closed and either relay 83 or relay 84 is energized depending on the position of the stepper switch arm 78. If it is on a start position, relay 84 will be energized; if it is on a stop position, relay 83 will be energized.

These relays, 83 and 84, are relay flip-flops so that when one is energized, the other is automatically deenergized. The contacts 85 and 86 of relays 83 and 84 control the "trap, vent" position of the prep exit system in the "trap auto" position, contact 85 controlling vent and contact 86 controlling trap.

When element 77 is advanced, the circuitry is looking for a new reference voltage from element 79 and element 80 and new control information from element 69 and new exit control information from element 78.

When several "slope polarity" switches are operated consecutively in the positive position with the "pass hold" switch in the hold position and when coincidence is reached, element 77 advances to the next position so that the next start or stop potentiometer, as the case may be, will be commanding a new and higher coincidence point which when reached by the input voltage will deenergize relay 65 (FIG. 2B) again and will energize relay 72 and repeat as in the foregoing. The same applies to multiple negative collections except the relay 65 is reversed.

In order for coincidence to occur and the traps to advance certain operational prerequisites are necessary, they are:
   a. If coincidence is programmed for positive slope, the positive slope relay 37 must be energized by the time coincidence is reached.
   b. If coincidence is programmed for negative slope, the negative slope relay 38 must be energized by the time coincidence is reached.
   c. The appropriate collect switch must be in the up position.
   d. The "start, stop polarity" switches must be set to the proper position.
   e. The auto manual exit switch on the prep must be in the auto position.
   f. The "pass, hold" switches must be in the proper position. These prerequisites, a through f, are the logistics of the system.

The "pass, hold" switches and circuitry are incorporated in the unit as a programming function to "hold" a series of sequential "trap, vent" commands in a given peak or "pass" them on the next peak.

After the unit has commanded the exit system to trap and vent once, element 78 (FIG. 2A) will be on the third contact, 87, and if the first "pass, hold" switch 88 is in the pass position (CLOSED), +24 volts will go through the switch 88 and a pulse through the 100 μfd. RC network, relay 89, through normally closed contact 90 and then energize relay 91. Contact 92 will latch and hold in the relay after the pulse has decayed.

Figure 3:
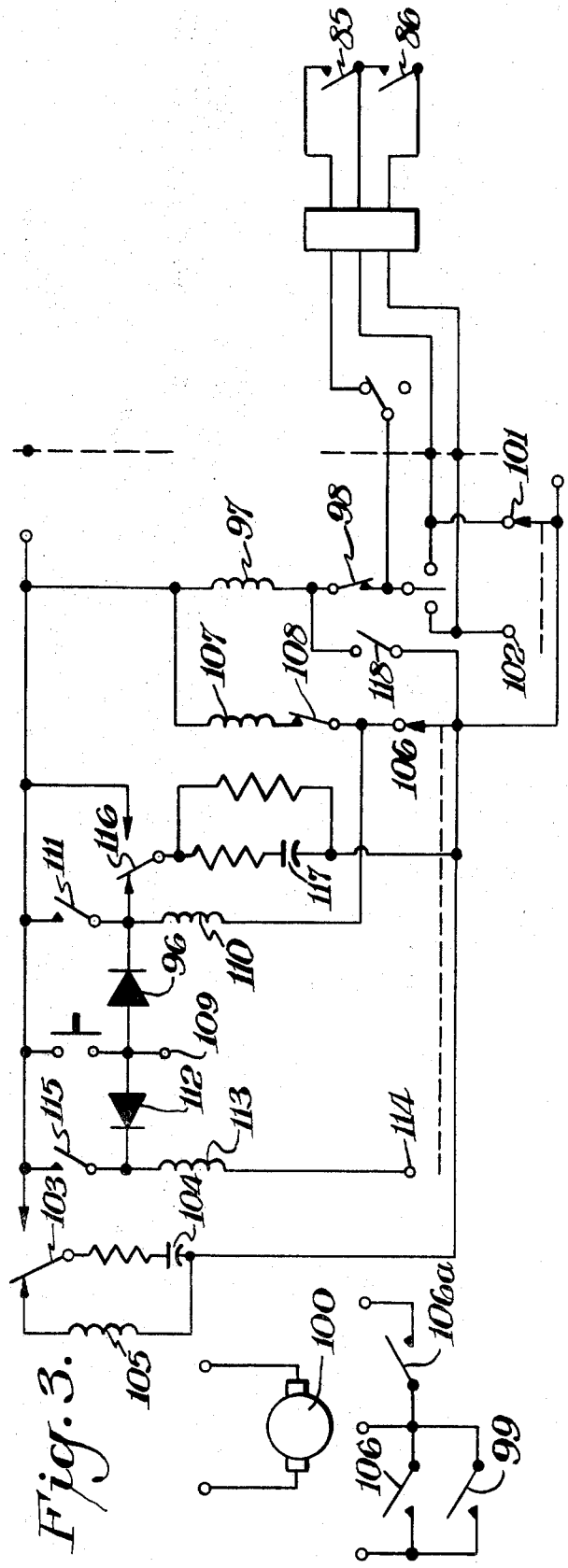
FIG. 3 is an electrical circuit diagram showing an exit control of this invention.

Contact 68, being open, will prevent any further points of coincidence from advancing element 77 until another plus slope is seen when relay 42 will energize and contact 93 will discharge the 100 μfd. condenser 94 through coil of relay 95 giving it a 1 second closure, opening contact 90 momentarily thus deenergizing relay 96, shown in FIG. 3. This allows contact 68 to close thereby enabling the coincidence controlled circuits to function again on the next peak.

When a pass, hold switch is in the hold position (open), there is no interruption of the element 69 voltage by contact 68, so that "start, stop" functions will be used up sequentially on the same peak as long as they are in a logical order.

Figure 4:
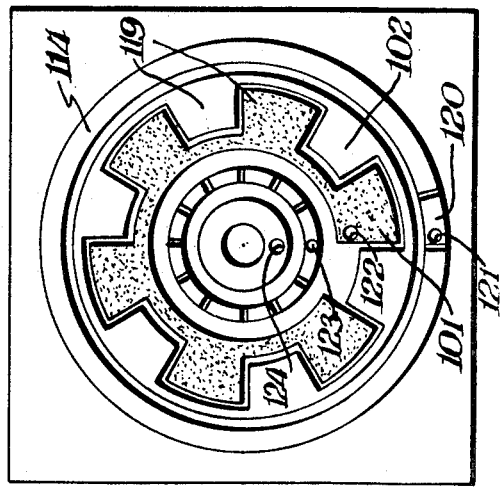
FIG. 4 is a plan view of the printed circuit wafer which is a part of the exit control.

Referring now to FIGS. 3 and 4, when contact 86 (FIG. 2A) in the peak selector computer closes, relay 97 (FIG. 3) is energized through normally closed contact 98. Contact 99 closes and energizes the exit valve drive motor 100 until the trap vent contact passes off the vent segment 101 (FIG. 4) of the printed circuit board and comes to rest on the trap segment 102. When relay 97 deenergizes, contact 103 discharges the 100 mfd. condenser 104 through relay coil 105 energizing it for 1 second. Contact 106 and 106a short the winding of motor 100 for 1 second providing a dynamic brake. When contact 85 (FIG. 2B and to right of FIG. 3) closes, relay 97 (FIG. 3) is energized through normally closed contact 98. Contact 99 closes and energizes the exit valve drive motor until the trap vent contact passes off the trap segment 102 of the printed circuit board and comes to rest on the vent segment 101. The motor is dynamically braked the same as in the preceding through relay 105.

This continues until all six trap and vent positions (such as the pair designated as 119 in FIG. 4) are used up at which time the exit system will come to rest at its starting (vent) position.

To prevent further actuation which would cause contamination of the samples already collected, when the home ring segment 120 which is reached in the home or start position, relay 107 is energized through normally closed contact 108 preventing any further actuation of relay 97 from any more external commands.

When the system is reset, it receives a 24 volt, 1 second signal on reset line 109. The voltage goes through diode 96 and energizes relay 110 which is held in by contact 111. Contact 108 opens, allowing contact 98 to close, readying the system for the next repeat sequence.

If all the exit positions are not used up, the home ring segment will not be reached. When this condition exists, the reset voltage goes into reset 109 through diode 112 and energizing relay 113 through the home common contact 114 (120 in FIG. 4) while relay contact 115 latches it in. Contact 116 charges capacitor 117. Contact 118 energizes relay 97 and contact 103 drives the exit motor until the home ring contact goes off the home ring and onto the home ring segment 114. At this time relay 113 deenergizes, and contact 116 discharges capacitor 117. Through relay 110, contact 111 holds it in and contact 108 opens, deenergizing relay 107. This allows contact 98 to close readying the system for the next repeat sequence. As can be seen in FIG. 4, there is a contact position for the home position for the sweeper arm (not shown) that circles the printed wafer. These are contacts 121, 122, 123 and 124 for the home or start position (120), 122 for the vent position (101), 123 for the trap position (102) and 124 line to common 24 v. source.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

We claim:

1. A system for interpreting a variation in voltage or current from a source at any stage in said variation which stage may be determined prior to activation of said system through a program control which system comprises:

A. a slope detector capable of sending signals as parameters of said voltage or current source;
B. an amplitude detector capable of sending signals as parameters of said voltage or current source;
C. means for simultaneously receiving said signals from said slope detector and from said amplitude detector and for simultaneously receiving command signals from a program control in a coinciding manner and for sending a directive signal to an electrical circuit when the signals from the slope detector and from the amplitude detector coincide with the slope and amplitude command signals preset in said program control;
D. program control means capable of being set to send said command signals to said receiving means; and
E. an electrical circuit to receive said directive signal from said receiving means.

2. A system in accordance with claim 1 which includes an element to be activated upon receipt by said electrical circuit of said directive signal.

3. A system in accordance with claim 2 in which said element is a valve.

4. A system in accordance with claim 3 in which said valve is connected to a collection means.

5. A system in accordance with claim 2 in which said element is a monitor.

6. A system in accordance with claim 1 in which said source for said variation in voltage or current is the detector in a chromatographic separator.

7. A system in accordance with claim 1 in which said source for said variation in voltage or current is a detector in a process stream.

8. A system in accordance with claim 1 in which said program control means is capable of sending a command signal to said receiving means which coincides with a signal from the plus and minus slope side, as desired, of the voltage or current signal being measured by said slope detector.

9. A system in accordance with claim 1 in which said program control means is capable of sending a command signal to said receiving means which coincides with a signal from said amplitude detector at a level as desired.

10. A system in accordance with claim 1 which includes means for ignoring selected peaks in a group of peaks.

11. A system in accordance with claim 1 which allows different slope and amplitude parameters (or criteria) to be applied, as desired, to each peak.